W. J. BAUROTH.
BALL BEARING.
APPLICATION FILED JUNE 30, 1917.

1,301,217.  Patented Apr. 22, 1919.

WITNESSES:
Harry C Dean
Dudley J Fisher

INVENTOR.
Walter J. Bauroth
BY
H. H. Bliss
ATTORNEY.

UNITED STATES PATENT OFFICE.

WALTER J. BAUROTH, OF COLUMBUS, OHIO, ASSIGNOR TO THE JEFFREY MANUFACTURING COMPANY, OF COLUMBUS, OHIO, A CORPORATION OF OHIO.

BALL-BEARING.

1,301,217.  Specification of Letters Patent.  Patented Apr. 22, 1919.

Original application filed April 17, 1913, Serial No. 761,754. Divided and this application filed June 30, 1917. Serial No. 177,905.

*To all whom it may concern:*

Be it known that I, WALTER J. BAUROTH, a citizen of the United States, residing at Columbus, in the county of Franklin and State of Ohio, have invented certain new and useful Improvements in Ball-Bearings, of which the following is a specification, reference being had therein to the accompanying drawing.

The present invention relates to certain new and useful improvements in ball bearings and particularly to that class of ball bearings which is adapted to the support of the armature shaft of an electric motor suitable for the propulsion of electric locomotives and similar purposes.

The reduction of the overall dimensions of a motor of a required power is of great importance when such a machine is used for the propulsion of vehicles. This is particularly true with locomotives for mine or other service where the track gage is restricted to narrow limits, and the motor is suspended from the wheel axle with its casing positioned partially between the wheels of the locomotive. The axial dimensions of the motor is in such a case limited to the distance between the wheels minus the width of the transmission gears connecting the motor shaft to the axle. A further limitation upon the size of the motor is the vertical distance from the center of its shaft to a plane close to the road bed, beyond which plane it cannot safely be extended without being liable to contact with irregularities or obstructions between the rails. With these two rigid and inflexible limitations placed on the overall motor dimensions, the problem confronting an engineer is, to produce a motor with as large a cross sectional area of copper as possible within these limits, since the horsepower of an electric motor, other things being equal, is directly proportional to the cross sectional area of the copper in its windings.

With the well known type of plain bushing bearing and with roller bearings as heretofore used, it has been impossible to extend the axial dimensions of the armature to points anywhere near approaching the wheels of the locomotive. In my invention I have arranged the bearings, together with their supporting members, in such a way as to permit the field magnet, as well as the armature, to extend axially in close proximity to the wheels of the locomotive, thus extending my copper area as far as possible in that direction, and materially increasing the power obtainable in a motor limited to the dimensions above set forth over the types as heretofore used.

In motors and generators difficulty is encountered in providing suitable journals for the armature shaft, which will not only prevent axial movement of the shaft, but also withstand severe usage. With the ordinary types of bushing, lack of oil for bearing metal, and other causes, frequently result in the bushing wearing to an oval shape, permitting the shaft to drop enough to allow the rotating armature to contact with the pole pieces. This disables the motor and necessitates its being entirely reconstructed. In the case of the machine in which the rotating element carries a commutator, contacting with stationary brushes, it is desirable to have this end of the armature shaft held positively from axial movement so that there will be no unnecessary wear and sparking at the commutator surface.

To obviate some of the above difficulties, I have mounted my armature shaft upon ball bearings positioned one at each end of the shaft and carried by the motor casing. It is well known that bearings of this type act not only as thrust bearings, preventing the axial movement of the shaft above referred to, but likewise reduce the danger of the shaft getting out of alinement and the armature striking against the pole pieces. The wear upon bearings of this kind is practically negligible, and the problem of lubrication is easily cared for. Ball bearings are for this reason particularly adapted for use on electrical apparatus used in mines, where a low class of labor is used in operating them, and the machines are subject to very hard usage. I have mounted the ball bearing at the commutator end of the shaft in such a manner within the frame of the motor that any thrust from the shaft is carried entirely by this bearing, the bearing at the opposite end being mounted so that it may move axially within certain limits and permit elongation of the shaft due to expansion. Both of the bearings are positioned so that they are located within the axial confines of the armature, the end pieces or heads on which the bearings are supported being flush with the end of the field casing.

This application constitutes a division of my copending application for motors, filed April 17th, 1913 Serial No. 761,754. In the said application I have shown and described in combination with the bearings which constitute the present invention an electric motor of a peculiar sort. The motor itself does not constitute a part of this invention and is herein shown and described only so far as is necessary for a clear understanding of the construction and operation of the bearing itself.

The preferred embodiment of my invention is disclosed in the following specification reference being had to the accompanying drawings of which—

Like numerals refer to similar parts in the several figures.

Figure 2:
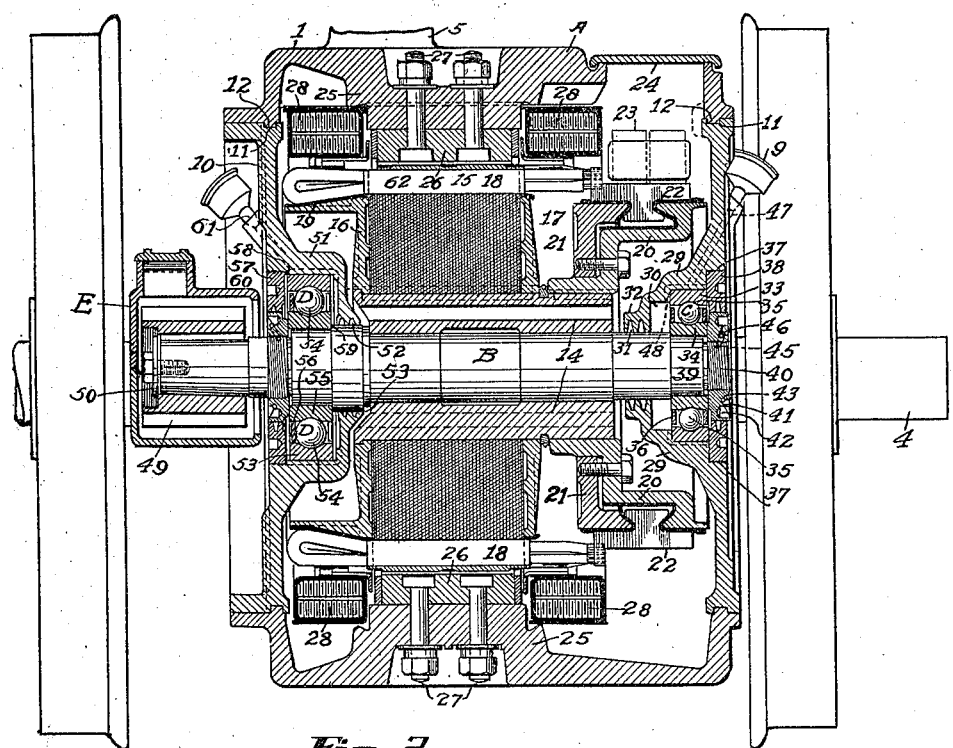
Fig. 2 is a sectional view of the motor shown in Fig. 1 taken along the line 2—2 of Fig. 1.
Figure 1:
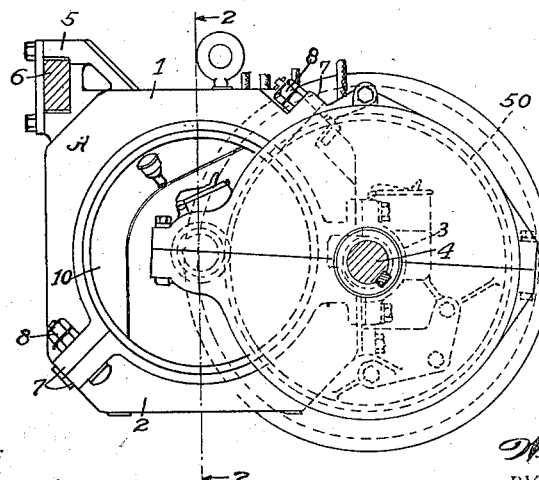
Figure 1 is a side elevation of an electric motor equipped with my improved ball bearings and mounted upon a locomotive axle, one of the locomotive wheels being severed from the axle to better illustrate the casing of the gear which connects the motor to drive the locomotive axle.

Referring to the drawings, the numerals 1, 2, indicate the upper and lower half of a divisible motor casing, indicated in general by the letter A. The motor, as illustrated, is of the railway type in which the casing is provided at one side with journal boxes 3, through which pass the locomotive axle 4. The casing is supported and held in position by the journals 3, and a bracket 5, extending upward from the upper half of the casing and secured to a transverse bar 6, on the truck frame. The line of division between the two halves of the casing A, is in a plane passing axially of the motor slightly above the center line of the shaft and at approximately forty-five degrees to the horizontal. Lugs 7, extend outward from the two sections and are provided with holes through which pass the fastening bolts 8.

The end sections 9, 10 of the motor are separable from the main casing. The end sections are circular in form and are provided at their peripheries with grooves 11, into which fit the annular tongues, 12, extending inward from the openings in the ends of the casing.

The shaft, B, carrying the armature spider, 14, is supported in bearings carried by the separable end walls, 9, 10. The armature laminations, 15, are secured between the two collars, 16 and 17, upon the spider, 14, and carry the armature windings, 18, disposed in any of the well known forms. The periphery of the collar, 16, is extended axially away from the center of the armature in the form of a drum, 19, which supports the ends of the armature windings and permits their extending in close proximity to the removable end wall, 10. At the other end of the motor, commutator carrying and clamping rings, 20 and 21, are secured upon the armature spider, 14, being spaced away from the armature shaft and extending in close proximity to the inner face of the end wall, 9. The armature windings, 18, are secured at the commutator end to the segments, 22, secured in place by the rings, 20 and 21, the commutator brushes, 23, being mounted in the frame and contacting with the commutator segments. A cap or cover, 24, is detachably secured on the top of the frame directly over the commutator so as to permit of its inspection.

The motor is of the box type in which the field comprises the motor casing and the type illustrated is provided with four inward extending pole pieces, 25, to which are secured laminated poles, 26, by means of bolts, 27. The field coils, 28, surround the poles, 26, and may be secured in position by any of the well known methods.

As previously stated, the armature shaft, B, is carried by roller bearings mounted at each end in the removable end pieces, 9 and 10. The end section, 9, which is positioned at the commutator end of the motor, is provided with an inward extended annular cup-shaped bearing support, 29, which extends within the space between the motor shaft and commutator carrying ring, 20, terminating in a ring, 30, in which are cut the oil grooves, 31, in close proximity to the armature shaft. The inward extending support, 29, is formed with three steps of varying diameters. The ring, 30, carrying the oil grooves, 31, extends axially inward in close proximity to the spider, 14. Directly outside of this, an increase of the diameter of the opening in the support, 29, forms a chamber, 32, of an axial depth approximately equal to the depth of the ring, 30. Directly outside of this, the diameter is again increased to receive the outer raceway, 33, of an annular bearing, C, the inner raceway, 34, of which is secured on the shaft, B, the balls, 35, being disposed between the two raceways and held in position by the rings, 36. The width of the second chamber, the outer face of which is indicated by the numeral 37, is approximately equal to the width of the outer raceway, 33, of the annular bearing. The opening in the support, 29, is further enlarged from the diameter of the chamber receiving the bearing C to provide a third or outer recess, which is threaded to receive a collar, 38. The collar, 38, when screwed into position, abuts against the outer axial face of the raceway, 33, and secures the outer raceway in position, preventing its axial movement. The armature shaft, B, is decreased somewhat in diameter at the section, 39, upon which the the inner race of the annular bearing, C, is secured, its end being still further decreased in diameter and threaded at 40 to receive a nut, 41, which secures the inner raceway upon the shaft. The annular bearing at this, the commutator end of the motor, is secured to prevent any axial movement of either raceway, thus preventing any axial movement of the shaft at this end. This bearing is thus required to receive and care for any end thrust which may be imposed upon the shaft. Shallow holes, 42, are drilled in the outer face of the nut, 41, to receive projections on a spanner wrench and permit the nut being tightened upon the shaft to secure the inner raceway from axial movement. An annular groove, 43, is cut in the outer face of the nut inside the openings, 42, and when the nut has been tightened upon the shaft and the bearings secured in place, a hole is drilled from the inner edge of the groove through the nut and into the threaded portion, 40, of the shaft. A split ring, 44, having one end, 45, bent so as to fit within the drilled hole, is then sprung into position within the groove, thus securely holding the nut in position by a simple and effective method. The nut, 41, when in place is approximately in the axial limiting planes of the screw ring, 38, and to prevent oil working outward upon the end of the casing, a groove, 46, is cut in the inner periphery of the ring, 38.

By the above described manner of mounting, the annular bearing is positioned entirely within the axial limits of the armature, and the outer face of the end wall, 9, is practically flush with the casing, neither the bearing nor any of its retaining devices extending beyond this surface. An oil hole, 47, extends inward from the outer face of the end wall, 9, to a groove, 48, which communicates with both sides of the annular bearing and permits oil to be fed from the outside of the casing to lubricate the bearing.

Power is taken from the motor through a pinion, 49, secured on the tapered end, 50, of the armature shaft, B. The bearing at the gear end of the armature shaft is mounted in many respects similarly to the bearing at the commutator end.

An annular cup-like bearing support, 51, extends inward from the inner face of the detachable head, 10, in a manner similar to the support, 29, at the opposite end. The oil grooves, 52, formed in the innermost end of the support, 51, extend well within the confines of the drum-shaped armature collar, 19, and within an opening, 53, cut in the gear end of the armature spider. From the oil grooves the inner opening of the support, 51, is enlarged to a diameter equal to the diameter of the outer raceway, 53, of the anular bearing, D, the other parts of which comprises the balls, 54, the inner raceway, 55, and the ball spreader rings, 56. The axial depth of the opening within which the outer raceway, 53, is inserted, is slightly greater than the width of the raceway, and the ring, 57, which screws into the outer end of the opening in the bearing support, 51, contacts with a shoulder, 58, limiting its inward travel, thus providing an outer abutment for the raceway, 53. As the depth of the opening in the support, 51, which receives the raceway, 53, is greater than the depth of the raceway, and is machined to an easy fit therewith, it is evident that this end of the shaft with its annular bearing, the inner raceway, 55, of which is secured in place between a shoulder, 59, on the shaft and a nut, 60, is free to move axially a slight amount.

It is essential that the commutator end of the motor shaft be free from axial movement to insure efficient commutation, and to provide for expansion of the shaft the annular bearing carried at the gear end is mounted as above described to permit of slight axial movement. The bearing at the gear end does not, therefore, take any of the end thrust of the shaft, all of this being taken by the bearing at the commutator end. An oil hole, 61, and groove, 62, are provided to permit proper lubrication of the bearing.

The pinion, 49, meshes with the gear, 50, keyed to the locomotive axle, 4, both gear and pinion being inclosed within a gear casing E attached to the motor frame. As the construction and arrangement of the gear casing E and of the devices by which the motor is supported upon and connected with the locomotive are well understood by those skilled in the art description of these parts is not thought to be required at this time.

What I claim is—

In a railway electric motor mechanism, having a driving axle, two track wheels rigidly connected thereto, power transmission gearing between the track wheels, a motor field frame hinged to the axle and positioned between the track wheels, an armature inclosed within the said frame, and an armature-shaft eccentric to the wheel axis, the combination with said motor frame of heads removably attached to the frame, and having inwardly-extending projections formed with outwardly-opening chambers, ball bearings for said shaft each comprising outer and inner raceways both removable outwardly from the chambers, outwardly-removable ringlike devices removably connected to the heads to retain the ball bearings in position, and means for supplying lubricant through the heads to the bearings, the fastening devices for the bearings being in the transverse planes of the heads and the heads being arranged close to the outermost planes of the frame.

In testimony whereof, I affix my signature, in presence of two witnesses.

WALTER J. BAUROTH.

Witnesses:
 DUDLEY T. FISHER,
 ANNA FENLON.

Copies of this patent may be obtained for five cents each, by addressing the "Commissioner of Patents, Washington, D. C."